(12) United States Patent
Beaulieu

(10) Patent No.: US 11,181,133 B2
(45) Date of Patent: Nov. 23, 2021

(54) FASTENING DEVICE TEMPLATE

(71) Applicant: Charles Beaulieu,
St-Just-de-Bretenieres (CA)

(72) Inventor: Charles Beaulieu,
St-Just-de-Bretenieres (CA)

(*) Notice: Subject to any disclaimer, the term of this patent is extended or adjusted under 35 U.S.C. 154(b) by 339 days.

(21) Appl. No.: 14/708,396

(22) Filed: May 11, 2015

(65) Prior Publication Data
US 2016/0333916 A1    Nov. 17, 2016

(51) Int. Cl.
*E04F 15/02* (2006.01)
*F16B 5/00* (2006.01)
*F16B 12/12* (2006.01)

(52) U.S. Cl.
CPC ........ *F16B 5/002* (2013.01); *E04F 15/02038* (2013.01); *F16B 12/125* (2013.01); *A47B 2230/0081* (2013.01); *E04F 2201/0115* (2013.01); *E04F 2201/0511* (2013.01)

(58) Field of Classification Search
CPC .. F16B 5/002; F16B 12/125; E04F 15/02038; E04F 2201/0115; E04F 2201/0511; A47B 2230/0081
See application file for complete search history.

(56) References Cited

U.S. PATENT DOCUMENTS

| 2003/0084636 A1* | 5/2003 | Pervan | E04F 15/04 52/592.1 |
| 2011/0265310 A1* | 11/2011 | Beaulieu | A47B 97/00 29/525.08 |

* cited by examiner

*Primary Examiner* — Jun S Yoo

(57) ABSTRACT

A fastening device template for joining mosaic pieces together having two variants that are easy to install by unskilled labor so as to help them achieve professional result. The device can be for assembling individual planks that together make up a floor covering such as solid wood flooring and engineered flooring, or it can be used for tiles. It can also be used to assemble individual parts which, together, create a piece of furniture. In this application, the generic term "mosaic" or "mosaic units" will be used to describe the individual pieces which, as indicated hereinabove, have a multitude of possible uses. Mosaic units can be assembled in all possible XYZ plans: side-to-side, side-to-face, side-to-end, end-to-end, end-to-face. In order to do so, the invention has an elongated clip core. At least one wing member attached to and extending a portion of the length of the clip core, and resilient leg members adapted to be frictionally inserted within a groove of a mosaic piece.

2 Claims, 8 Drawing Sheets

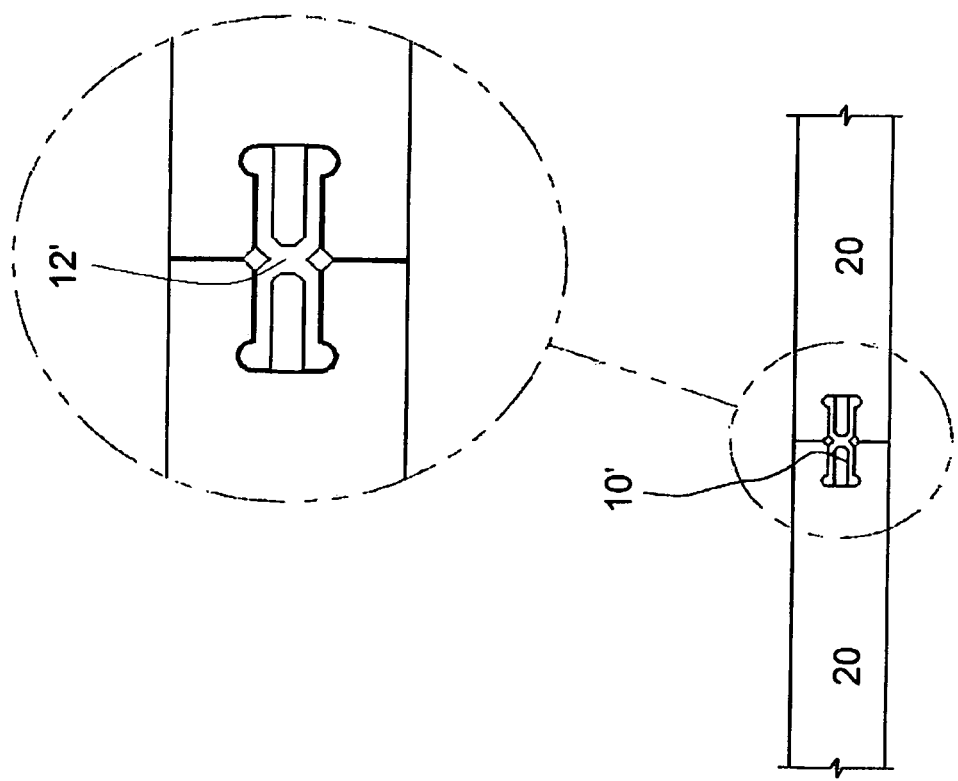

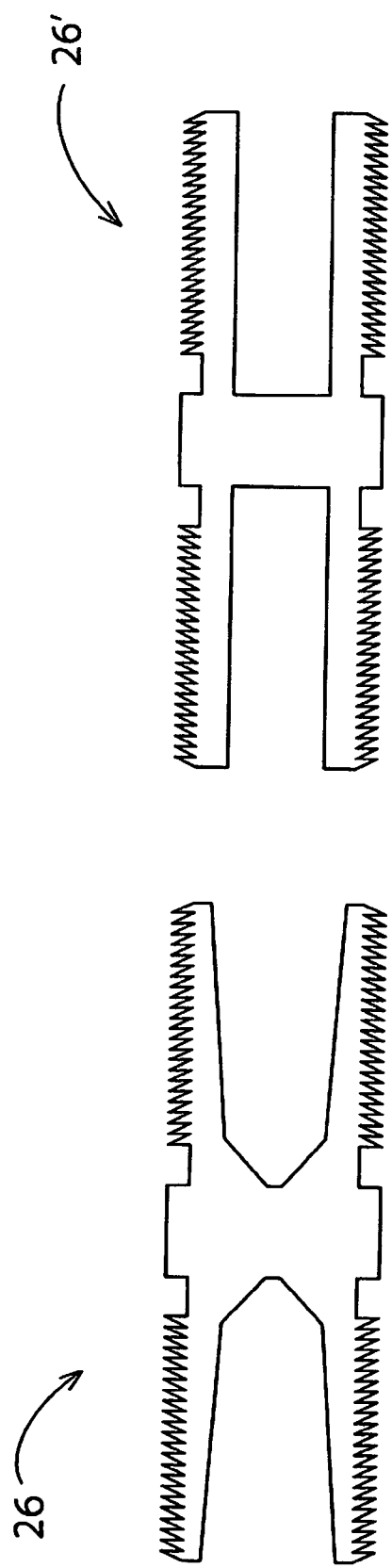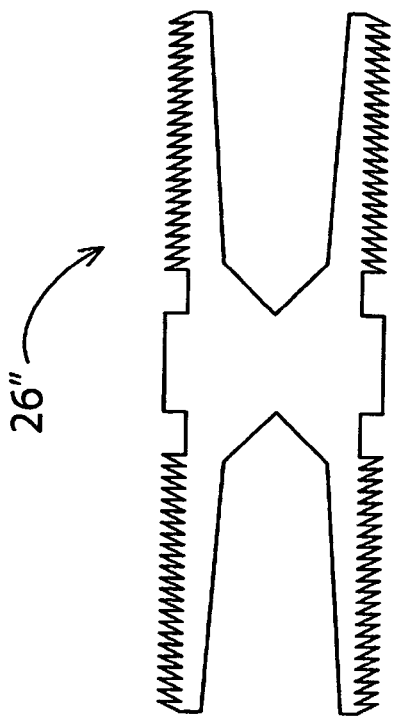
FIG. 6a
FIG. 6b
FIG. 6c

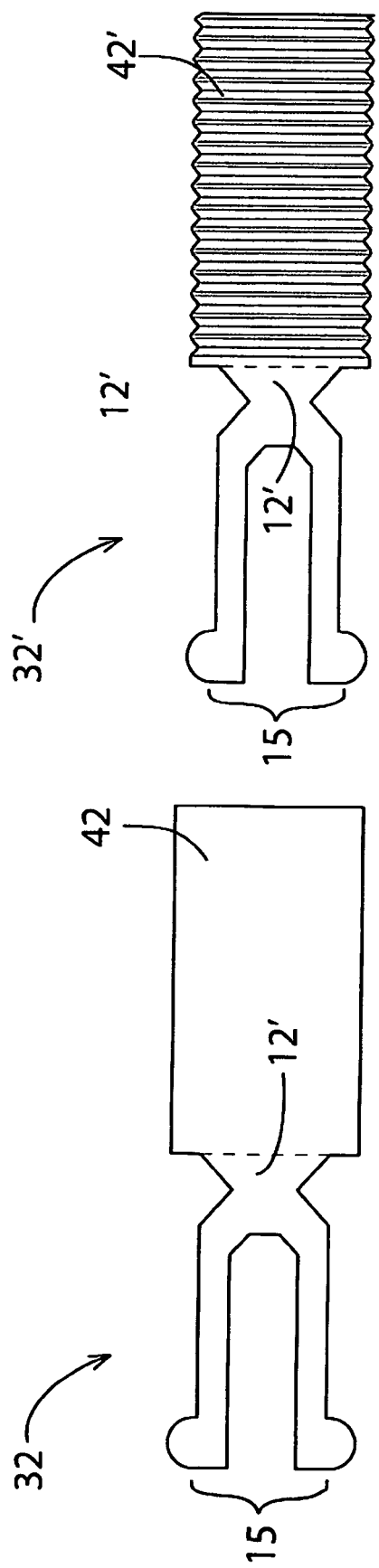
FIG. 9a
FIG. 9b
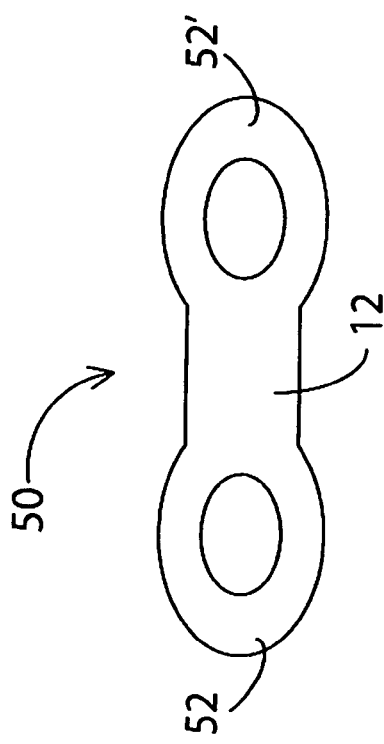
FIG. 10

FASTENING DEVICE TEMPLATE

The present application is a continuation in part of the application U.S. Ser. No. 13/042,594 filed on Mar. 8, 2015 by the same inventor and having same title. There are many types of fastening means used for assembling parts together such as for building furniture or joining pieces of lumber or planks such as for flooring for example. These fastening means come in the forms of mortise and tenon; tongue and groove; dovetail; dowel; biscuit; etc.

FIELD OF THE INVENTION

The present invention relates generally to fastening means but more particularly to a fastening device template used for joining mosaics.

BACKGROUND OF THE INVENTION

A fastening means of particular relevance is that of U.S. Pat. No. 7,021,019 by Knauseder. However, that patent bears some striking differences as it is used for a different use.

| Beaulieu | Knauseder |
|---|---|
| Longitudinal profile of the clip | Horizontally flat configuration of the clip |
| Protruding tips | Tapered arms |
| Clipped in a groove or channel | Clipped in a recess |
| Clip and groove profile need to fit perfectly | Clip and recess do not need to be manufactured with great accuracy |
| Clip that can slide along the groove | Clip that cannot slide within the recess |
| Clip inserted in a plan perpendicular to the surface of the board (side) for flooring applications, and on every other possible plane of mosaic pieces for applications such as cabinet box construction | Clip inserted is only feasable in a plan parallel to the surface of the panel (underside) |
| Groove & groove profile (no tongue) | Panels still require a tongue & a groove |

SUMMARY OF THE INVENTION

It is a main advantage of this invention to provide for a fastening device template that is easy to install by unskilled labor so as to help them achieve professional result. The application can be for assembling individual planks that together make up a floor covering such as solid wood flooring and engineered flooring, or it can be used for tiles. It can also be used to assemble individual parts which, together, create a piece of furniture. In this application, the generic term "mosaic" or "mosaic units" will be used to describe the individual pieces which, as indicated hereinabove, have a multitude of possible uses. Mosaic units can be assembled in all possible XYZ planes: side-to-side, side-to-face, side-to-end, end-to-end, end-to-face, face-to-face.

In order to do so, the invention provides a fastening device in combination with at least two mosaic pieces each having a groove; the fastening device is for joining both two mosaic pieces together. The device comprising an elongated clip core comprising at least one wing member, each wing terminated by a perpendicular protruding tip. The at least one wing member attached to and extending the length of the clip core.

The wing member consisting of a resilient leg member adapted to flex and be inserted within the groove of the mosaic piece.

Each groove of each mosaic being longitudinal with protruding void tip at a distal end thereof, and the fastening device being inserted into each groove of the mosaic pieces until the elongated clip core ended by the protruding tips coincides inside the groove, with the protruding tips of the fastening device coinciding inside the protruding void tips channel of each the groove to thereby hold the mosaic pieces together. Each protruding void tips channel of each groove comprises an exterior angle providing space for the perpendicular protruding tip to continue to flex and to be deformed when the mosaic pieces made of wood is transformed. For example when it dries, the wood decreases in volume and compresses the fastening device which stretches and fills the space formed by the exterior angle, and make coincides the protruding tips with the inner contours of the protruding void tips.

Each of the mosaic pieces comprises also an angle at the junction side, directed inward, thus providing space to the fastening device which is between the joined mosaic pieces to stretches and fills this space and make coincides the inner contours of the center of the fastening device (the elongated clip core) ith the inner contours of the groove.

That means that another angle (named 48 in the FIG. 3*a*) is therefor formed above the center of the fastening device, its edges are the inward inclinations of each of the longitudinal sides of each of the mosaic pieces, this angle is about 0.5°. Again, for the mosaic pieces made of wood, when the wood dries and decreases in volume, the wood compresses the fastening device which stretches and fills the space formed by the angle of about 0.5°, and make coincides the elongated clip core with the inner contours of the groove.

The fastening device remains then always flexible, and the mosaic piece's are always joined together whatever the transformations of the wood.

The fastening device may comprise two wing members.
Types of Fastening Devices:

The first variant (FIGS. 1 and 3) comprises an elongated clip core, at least one wing member attached to and extending the length of the clip core, the at least one wing member ends by a protruding tip. The wing member and the protruding tip are configured and sized to be frictionally inserted within a sized groove of a mosaic piece to thereby frictionally hold the mosaic piece to a chosen support member or hold the mosaic to another mosaic piece.

The sized groove comprises a longitudinal channel with a protruding void tip channels at a distal end thereof, such that the at least one wing member are adapted to be frictionally inserted within the longitudinal channel and the protruding tip are configured and sized to be frictionally inserted within the protruding void tip channel.

The clip core of the first variant further includes a resilient central large protruding tip adapted to further increase the friction between the fastening device and the mosaic piece.

The fastening device can be made from a material chosen from a list of materials including plastic, metal, and ferrous material or wood. The second variant (FIGS. 2 and 4) of the fastening device has an elongated clip core. Two wings member attached to and extending the length of the clip core, each wing member consisting of two resilient leg members adapted to flex and be frictionally inserted within corresponding groove of a mosaic piece, to thereby frictionally hold the mosaic piece to a chosen support member or to another mosaic piece. Furthermore each leg member has a protruding tip at a distal end thereof, such that the protruding tip extends in opposite directions from one another; and wherein each leg member and protruding tip is adapted to fit within a complementary configured and sized groove of the mosaic pieces, such groove is having a longitudinal void channel with protruding void tip channel at a distal end thereof, such that the fastening device leg member fill the space in the longitudinal void channel and the fastening device protruding tip fill the space in the protruding void tip channel of the groove.

Other Variants of Fastening Devices:

FIG. 5 A fastening device having two distant protruding tips instead of a central large protruding tip. Such device may be used for connecting two mosaics having a V-shaped space in between.

FIG. 9 A variant of the previous model is a fastening device comprising one pair of wings extending the length at one side of the clip core and the other side of the clip core is ending with a larger tip to be frictionally inserted or screwed inside a piece of furniture for furniture.

FIG. 6 The legs may be toothed.

FIG. 8 The legs may be crossed.

FIG. 7 The clip core may be shaped rectangular (or with square angles) so as the protruding tips.

FIG. 10 A fastening device having a longitudinal clip core ending with circular rings to be frictionally inserted inside a sized groove of a mosaic piece to thereby frictionally hold the mosaic piece to another mosaic piece or to a chosen support member. The circular rings are compressed during the insertion inside the grooves and expand to their initial shape inside the grooves.

All those variants can be made from a material chosen from a list of materials including plastic, metal, ferrous material, and wood.

The present invention also describes a method of joining mosaic pieces together; such method comprises the following steps:

a.) providing at least two mosaic pieces having predetermined sized and shaped grooves on their sides, said grooves ends or faces and extending along the lengths of the mosaics.

b1.) Providing a fastening device between each adjoining pair of mosaic pieces, and inserting the fastening device within the respective grooves to thereby frictionally hold the mosaic pieces together; wherein the fastening devices each comprise two wing members attached and extending from opposite sides of the clip core and extending the length of the clip core. Both wing members end by a protruding tip (FIG. 1). Each wing member and their protruding tips are frictionally inserted within corresponding grooves of the adjacent mosaic pieces to thereby frictionally hold them together. Each groove of each mosaic comprises a longitudinal channel with a protruding void tip channels at a distal end thereof, such that the wing member are frictionally inserted within the longitudinal channel and the protruding tips are frictionally inserted within the protruding void tip channel.

b2.) Providing a fastening device between each adjoining pair of mosaic pieces, and inserting the fastening device within the respective grooves to thereby frictionally hold the mosaic pieces together; wherein the fastening devices each comprise two wing members attached and extending a portion of the length of the clip core. Both wings member each consisting of resilient leg members adapted to be frictionally inserted within the grooves of the adjacent mosaic pieces, and wherein each leg member has a protruding tip at a distal end thereof, such that the protruding tips extend in opposite directions from one another; and wherein each leg member and protruding tip is adapted to complementarily fit within the configured and sized groove of respective adjacent mosaic pieces.

The groove is having a longitudinal void channel with a protruding void tip channel at a distal end thereof, such that the fastening device wing members fill the space in the longitudinal void channel and the fastening device protruding tips fill the space in the protruding void tip channel of the groove.

The method of joining mosaic pieces, wherein step a.) further includes placing glue within the grooves of the mosaic pieces before placing the fastening devices therein, to thereby further strengthen the final connection between respective mosaic pieces.

The method of joining mosaic pieces, wherein the fastening device can be made from a material chosen from a list of materials including plastic, metal, ferrous material, and wood.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto:

In this respect, before explaining at least one embodiment of the invention in detail, it is to be understood that the invention is not limited in its application to the details of construction and to the arrangements of the components set forth in the following description or illustrated in the drawings. Such as the previously listed side-to-side, side-to-face, side-to-end, end-to-end, end-to-face, face-to-face configurations. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 4*a-b* End view, and end view detail, respectively, of the invention of FIG. 2 in context of use in a side by side mosaic configuration.

FIGS. 6*a-c* shows first variants of FIG. 2 with toothed legs.

FIGS. 9*a-b* shows fourth variants of FIG. 2 with a tip for insertion at one end.

FIG. 10 shows a second variant of FIG. 1 with two circular rings ending longitudinal clip core.

DETAILED DESCRIPTION OF THE PREFERRED EMBODIMENTS

Figure 1:
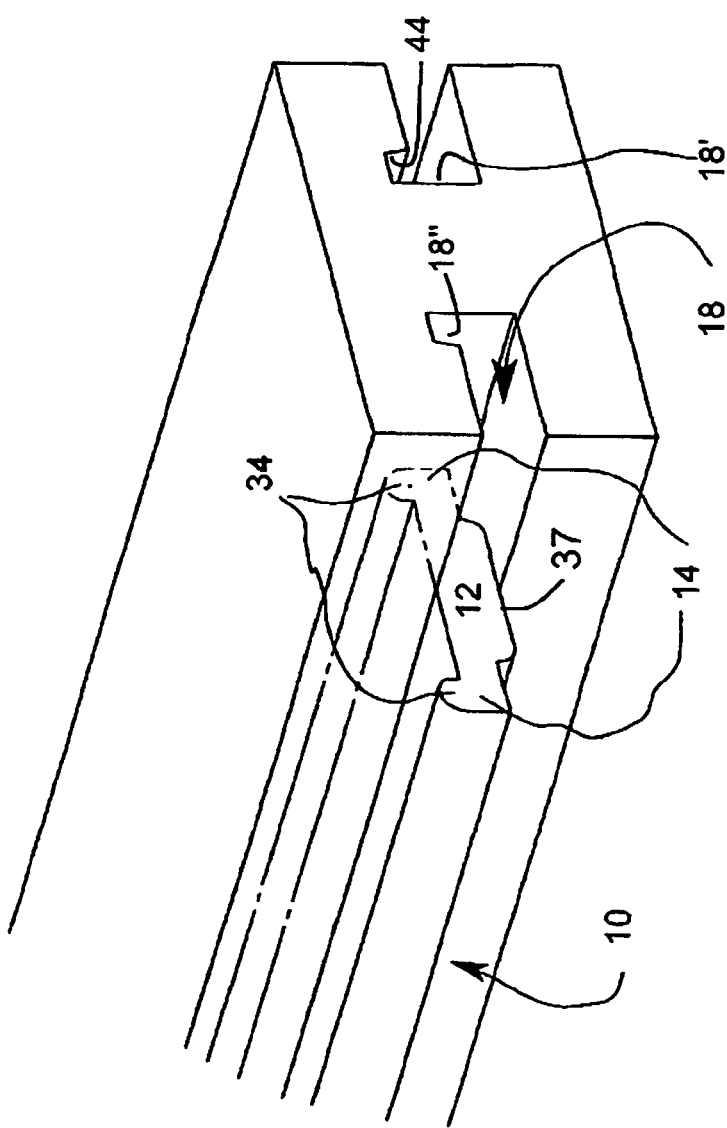
FIG. 1 Isometric view of a first variant of the invention showing insertion through the side of a mosaic.

In the following description and in the accompanying drawings, the reference numerals refer to identical parts in the various figures.

FIG. 1 shows a fastening device (10) having a clip core (12) and wings (14). The clip core is having a central large protruding tip (37), the ends thereof are wings (14), and each wing (14) is ending by a protruding tip (34). The protruding tips (24) are configured and sized for frictional insertion into complementarily configured and sized grooves (18) formed by a longitudinal channel (18') with protruding void tip channel (18") at a distal end thereof. An exterior angle (44) in the protruding void tips channels (18") provides enough space for the perpendicular protruding tips (34) to continue to flex and be deformed when the mosaic pieces made of wood are transformed. For example when the wood dries, the wood decreases in volume and compresses the fastening device which stretches and fills the space formed by the exterior angle, and make coincides each protruding tip (34) with the inner contours of the corresponding protruding void tip channel (18").

The fastening device remains then always flexible, and the mosaic pieces are always joined together whatever the transformations of the wood.

Figure 2:
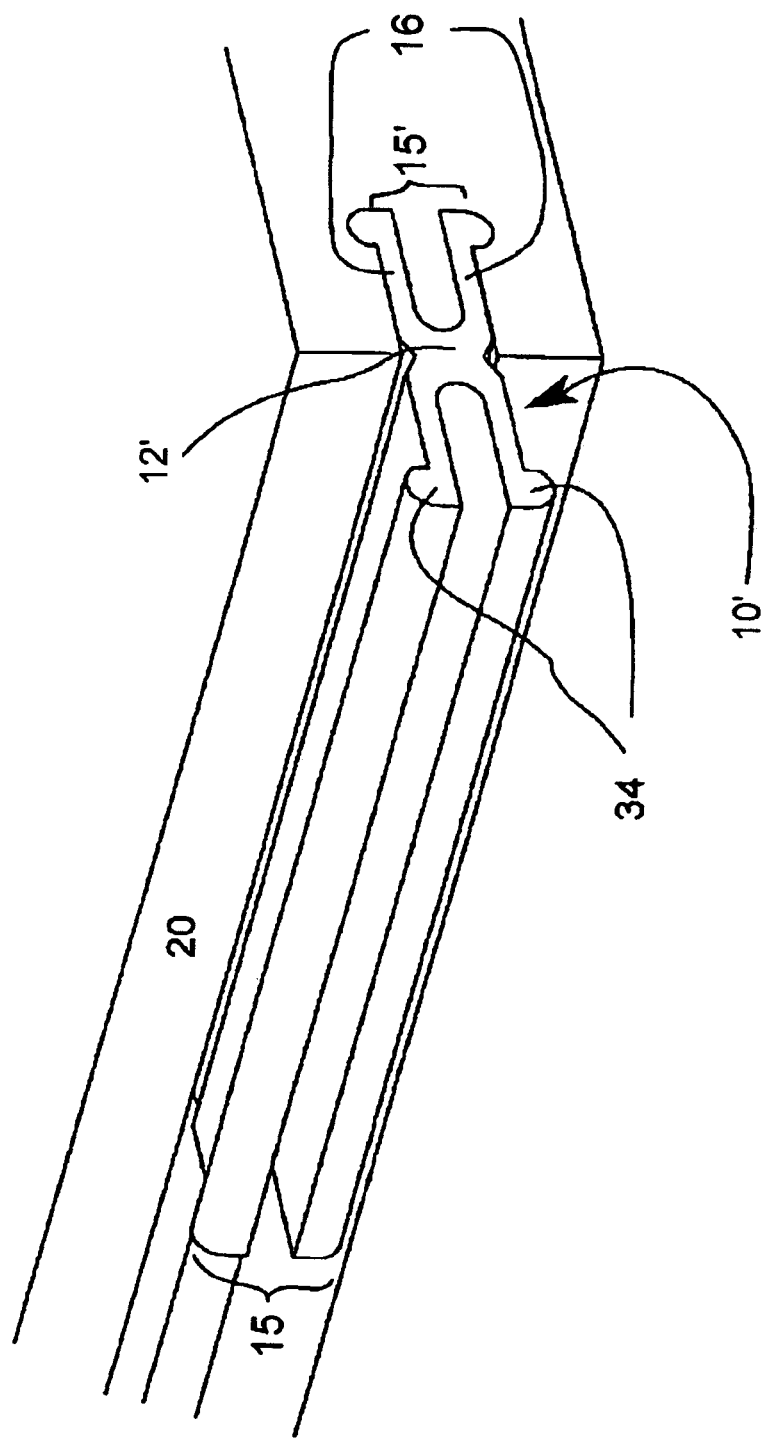
FIG. 2 Isometric, view of a second variant of the invention showing insertion through the side of a mosaic.

FIG. 2 shows a second variant (10') of the fastening device having a clip core (12') between two wings (15,15'). Each wing generally consists in twin legs (16) that are resiliently flexible to allow for frictional insertion into a groove made within a plank, board, piece of furniture henceforth referred to as a mosaic (20). Each leg is ending by a protruding tip.

Figures 3A, 3B, 3C:
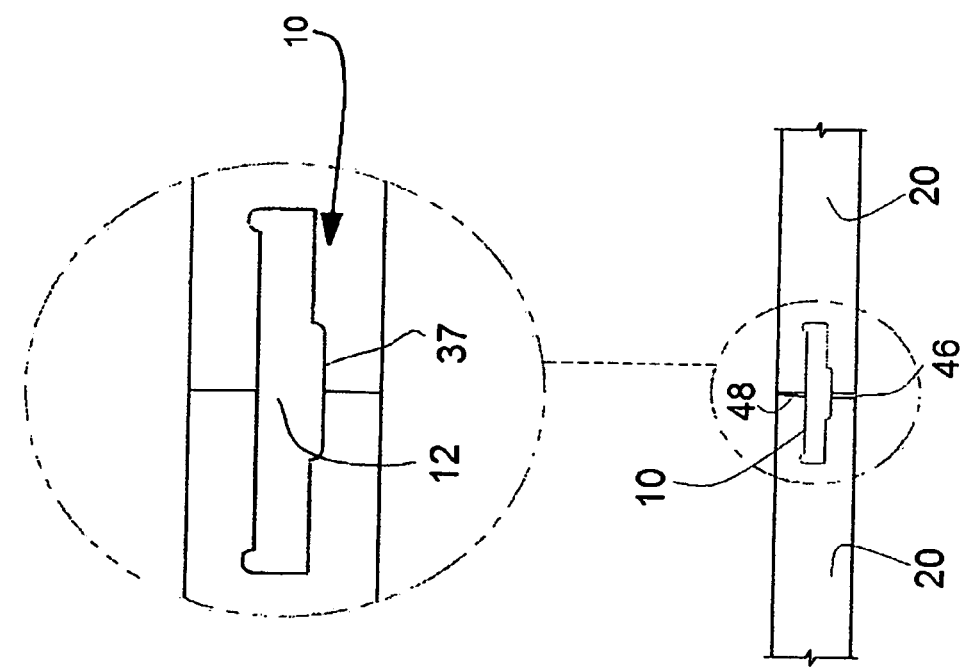
FIGS. 3*a-b* End view, and end view detail, respectively, of the invention of FIG. 1 in context of use in a side by side mosaic configuration.
FIG. 3*c* End view detail of two pieces of the invention of FIG. 1 in context of use in a side by side mosaic configuration.

FIGS. 3*a*-3*b* show the fastening device (10') which connects two mosaics (20) placed side by side. In FIG. 3*b* one sees the fastening device having a clip core (12), two wings and a central large protruding tip (37).

In FIG. 3*a* each of the mosaic pieces (20) comprises an angle their longitudinal side, they are inclined inwardly at the junction side, the inclination provides space for the elongated clip core (12) to continue to flex, to be deformed. And to be inserted within the grooves until the elongated clip core coincides with the inner contour of the groove. An angle (48) is formed above the clip core by both inward inclinations of each of the longitudinal sides of each of the mosaic pieces, and is about 0.5°. This angle is very important for the mosaic pieces made of wood because, when the wood dries and decreases in volume, the wood compresses the fastening device which stretches and fills the space formed by the angle of about 0.5°, and make coincides the elongated clip core (12) with the inner contours of the groove (18).

One sees the tiny space (46), the space occupied by the angle (48) below the clip core of the fastening device (10).

FIG. 3*c* shows two fastening devices (10) disposed against each other so that their central large protruding tips are pressed together. Both pieces connect two mosaics (20) placed side by side. The protruding tips of both fastening devices are configured and sized for frictional insertion into complementarily configured and sized grooves made in the mosaics (20).

As seen in FIGS. 4*a*-4*b*, the fastening device (10') with a central large protruding tip (37) at the clip core (12') is frictionally interacting a part of the mosaic (20). The use of resilient deformation for insertion of one element into another element wherein both elements present complementarily configured and sized shapes is known in the art and need not be further discussed herein.

Figure 5A:
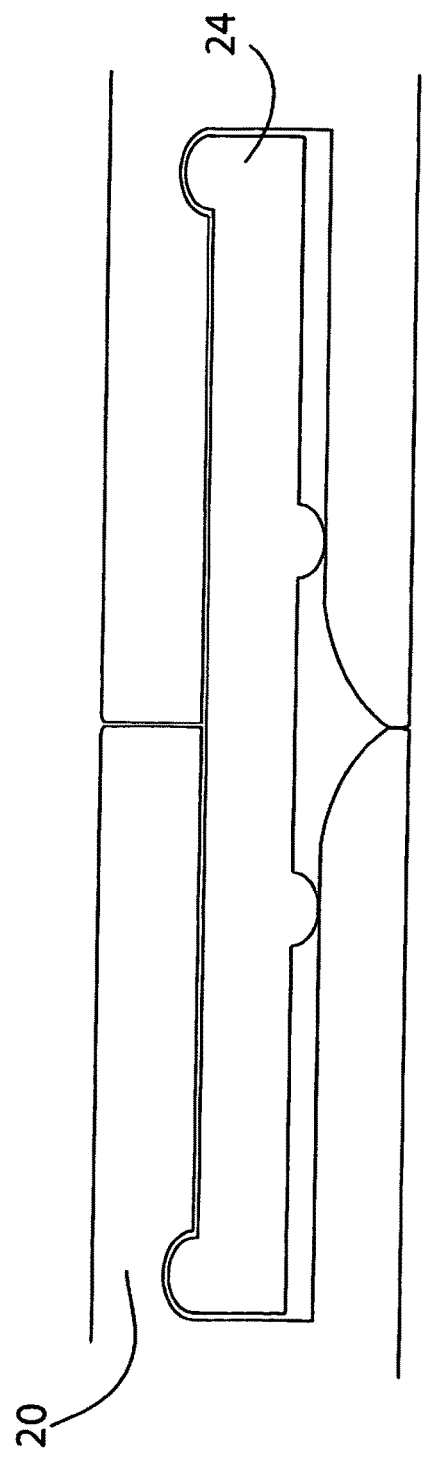
FIGS. 5*a-b* shows first variants of FIG. 1 with two distant tips below.
Figure 5B:
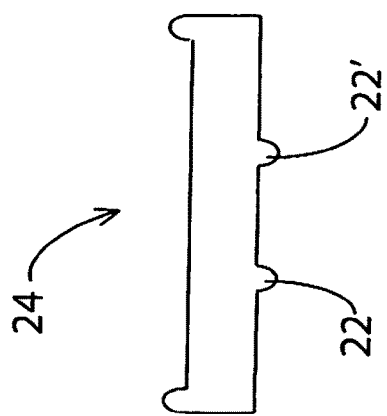

FIGS. 5*a*-5*b* show variants (24) of the fastening device of FIG. 1 which have two protruding tips (22,22') instead of the central large protruding tip (37). Such device (24) may be used for connecting two mosaics (20) with a V-shaped space in between.

FIGS. 6*a-c* show first variants (26,26',26") of FIG. 2 with toothed legs and clip cores in a rectangular shape.

Figure 7B:
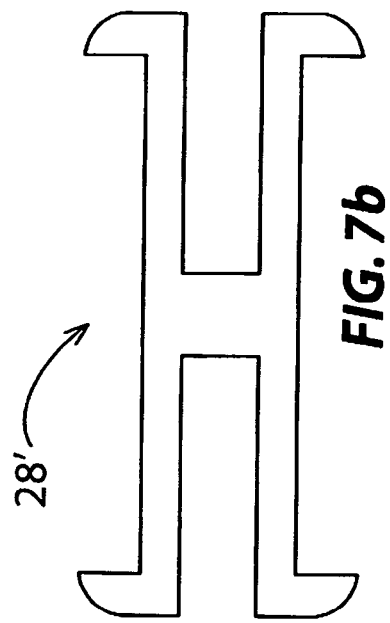
FIGS. 7*a-b* shows second variants of FIG. 2 with square angles.
Figure 7A:
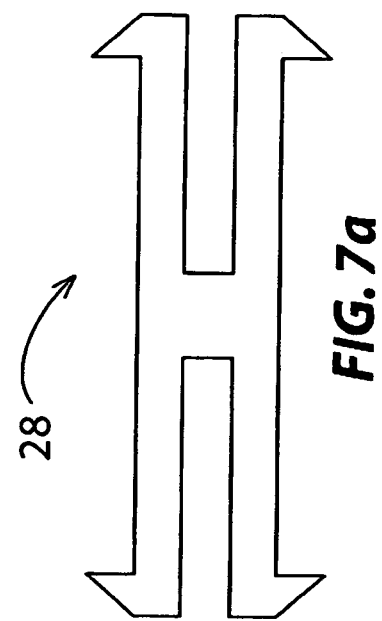

FIGS. 7*a-b* show second variants (28,28') of FIG. 2 with all the angles square.

Figure 8B:
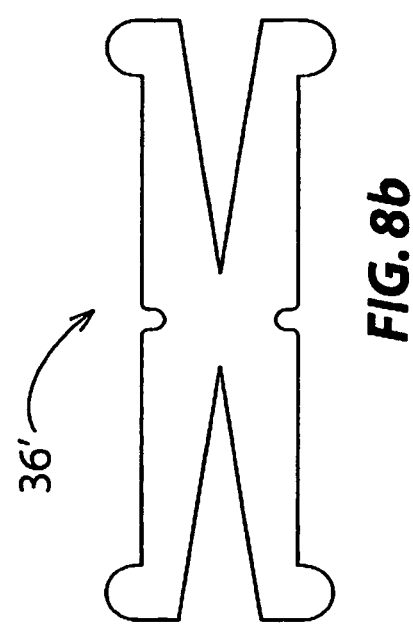
FIGS. 8*a-b* shows third variants of FIG. 2 with crossed legs.
Figure 8A:
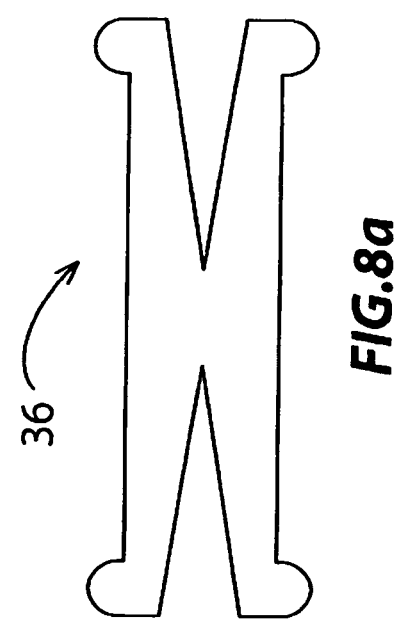

FIGS. 8*a-b* show third variants (36,36') of FIG. 2 with crossed legs.

FIGS. 9*a-b* show fourth variants (32,32') of FIG. 2 having a pair of wings (15) at a side of the clip core (12') and the other side of the clip core is ending with a tip to be frictionally inserted or screwed inside a piece of furniture for furniture.

FIG. 10 show a second variant of FIG. 1 having circular rings (52,52') ending a longitudinal clip core (12) instead of protruding tips. The circular rings are configured and sized for frictional insertion into complementarily configured and sized grooves, during the insertion the circular rings are compressed and they expand to their initial shape inside the groove.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| PARTS | |
|---|---|
| 10 | Fastening device |
| 10' | Second variant fastening device |
| 12,12' | Clip cores |
| 14 | Wing |
| 15,15' | Opposite pair of wings |
| 16 | Legs member |
| 18 | Groove |
| 18' | Longitudinal channel of the groove 18 |
| 18" | Protruding void tip channel of the groove 18 |
| 20 | Mosaics |
| 22,22' | Two distant protruding tips |
| 24 | Fastening device having protruding tips 22,22' |
| 34 | Protruding tip |
| 37 | Central large protruding tip |
| 26,26',26" | Fastening devices with toothed legs |
| 28,28' | Fastening devices having square angles |
| 32,32' | Fastening devices ending with tips for insertion |
| 42 | A tip for insertion by friction |
| 42' | A screwed tip |
| 44 | Exterior angle of the protruding void tip channel 18" |
| 46 | Tiny space |
| 48 | Angle of about 0.5° |
| 50 | Fastening device with circular rings ending the core. |
| 52,52' | Circular rings |

I claim:

1. An assembly of at least two mosaic pieces made of wood, each having a groove and a fastening device for joining said two mosaic pieces together, said device comprising an elongated clip core comprising at least one wing member,
   wherein each said wing member is terminated by a perpendicular protruding tip; said at least one wing member attached to and extending a portion of the length of said clip core, said at least one wing member consisting of a resilient leg member adapted to flex and be inserted within said groove of said mosaic piece;
   wherein each said groove being longitudinal with ends terminated by a protruding void tip at a distal end thereof and said fastening device positioned within each said groove of said mosaic pieces such that said elongated clip core ended by said protruding tips coincides inside said groove, with said protruding tips of said fastening device coinciding inside said protruding void tips of each said groove to thereby hold said mosaic pieces together, said protruding void tips of each said groove comprising an exterior angle providing a space for said perpendicular protruding tip and opposing surfaces of the at least two mosaic pieces slanted to form an angle of about 0.5 degrees therebetween, providing an inverted "V" shape space between the at least two mosaic pieces.

2. The fastening device of claim 1, wherein said fastening device can be made from a material chosen from a list of materials including plastic, metal, ferrous material, and wood.

* * * * *